C. B. SCHOENMEHL & M. L. MARTUS.
PRIMARY BATTERY.
APPLICATION FILED FEB. 9, 1917.

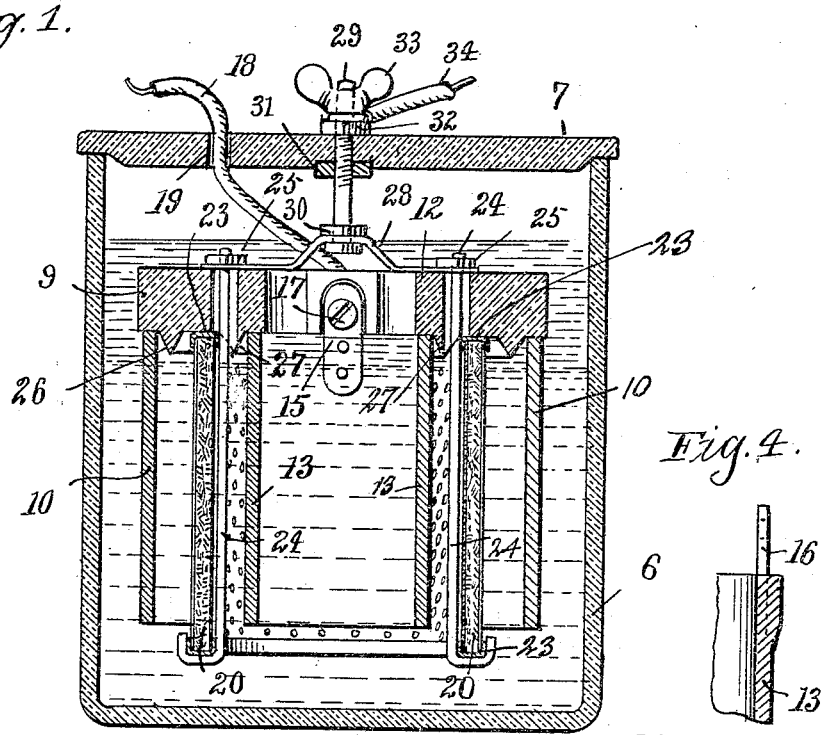
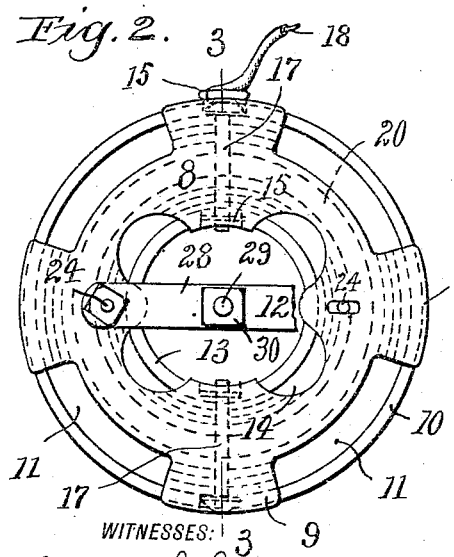
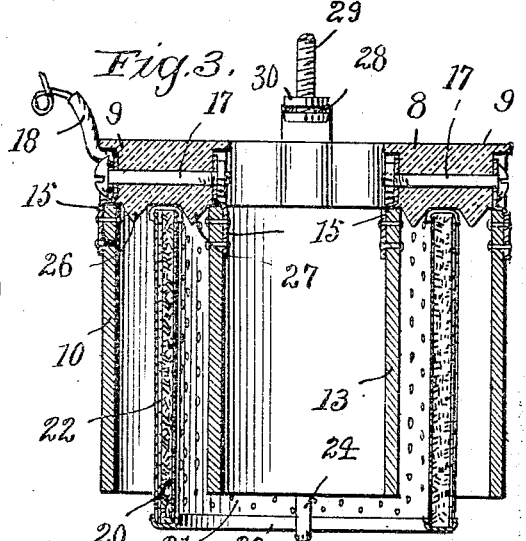

1,297,918.

Patented Mar. 18, 1919.
2 SHEETS—SHEET 2.

Witnesses
Ruth M. H. Koger

Inventor
Charles B. Schoenmehl and
Martin L. Martus
By Chamberlain & Newman Attorneys

UNITED STATES PATENT OFFICE.

CHARLES B. SCHOENMEHL AND MARTIN L. MARTUS, OF WATERBURY, CONNECTICUT, ASSIGNORS TO THE WATERBURY BATTERY COMPANY, OF WATERBURY, CONNECTICUT, A CORPORATION OF CONNECTICUT.

PRIMARY BATTERY.

1,297,918.      Specification of Letters Patent.      Patented Mar. 18, 1919.

Application filed February 9, 1917. Serial No. 147,697.

*To all whom it may concern:*

Be it known that we, CHARLES B. SCHOENMEHL and MARTIN L. MARTUS, citizens of the United States, and residents of Waterbury, in the county of New Haven and State of Connecticut, have invented certain new and useful Improvements in Primary Batteries, of which the following is a specification.

Our invention relates to what are commonly known as cylindrical forms of primary batteries employing an active solution contained within a covered jar.

The invention further and particularly relates to a novel form of supporting means for both the positive and negative cylindrical elements whereby the same may be spaced one from the other and readily supported and suspended within the solution through a single rod or hanger when attached to the cover of the jar; to include means for preventing the adhesion to the under side of the insulative member of the disintegrated portions of the elements and whereby the electrodes might become short circuited; further to arrange and construct the parts so as to afford a practical and rigid assemblage of the several parts of the device so as to permit the same to be commercially manufactured in an economical manner, to construct the device so that ample contact is provided with the respective elements to insure a proper and economical working of the battery and also so that the two positive elements will be directly connected one with the other and provided with a single feed wire that is fully insulated from the negative element which in turn is connected from two or more different points and provided with a single binding post.

Further objects of the invention are to provide a commercial form of cylindrical element support from which the electrodes may be readily disconnected and new ones applied as occasion requires without necessarily discarding anything except the bare elements themselves, thus permitting renewals to be made, furnished and attached at a comparatively small expense.

Upon the accompanying two sheets of drawings forming a part of this specification similar characters of reference will be found to designate like or corresponding parts throughout the several figures and of which—

Figure 1 shows a central vertical section through our improved form of battery complete.

Fig. 2 is a detached plan view of the assembled elements as contained within the jar shown in Fig. 1 and clearly illustrating a top view of the insulative supporting member to which the electrodes are attached.

Fig. 3 is a further central vertical cross section taken through the assembled elements on line 3—3 of Fig. 2 and at a right angle to the section line of Fig. 1.

Fig. 4 shows a detail vertical sectional view of a modified form of construction for the attachment of the positive element or elements to the insulative support.

Figure 5:
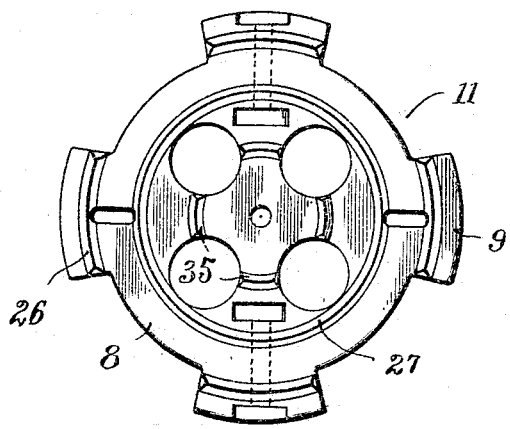
Fig. 5 shows an inverted detached plan view of a slightly modified form of the insulative support for the elements.

Referring in detail to the characters of reference marked upon the drawings 6 indicates a battery jar and 7 a cover both of which may be of the usual or any preferred construction and in which the assembled elements together with the active solution are contained.

8 represents the insulative supporting member which as will be noted is of a general annular form and to the under side of which the several electrodes are attached. Outwardly disposed extensions 9 are formed on the outside of this supporting member. The positive electrode 10 is secured to the underside of this extension and in a way to leave an opening 11 between the said body of the supporting member and the said electrode, thus better exposing the electrode to the action of the solution.

Inwardly exposed extensions 12 are formed upon the inner side of the annular supporting member to receive the inner annular positive element 13 and also in a way to form openings 14 between the supporting member and the top edge of the positive element as is clearly shown in Fig. 2.

The positive electrodes may be formed of either cast or rolled zinc and each is provided with metal hangers which may be formed in any preferred manner, as for instance, a piece 15 attached to the body of the positive electrode as shown in Fig. 3, or cast integral therewith, as shown at 16 in Fig. 4. The construction of the hanger as employed upon both the inner and outer positive electrode may be substantially alike in construction and are each provided with a hole through which a screw bolt 17 passes in its method of securing the two like electrodes to the supporting member and in its further purpose of electrically connecting the two like electrodes. These screw bolts, as will be noted, are arranged radially and central of the supporting member so as to be entirely insulated from the negative element. Both of the screws 17 thus serve to engage the two positive elements 10 and 13 in a manner to rigidly secure the same to the insulative supporting member and whereby both of the said elements may be detached by the removal of the two screws. The terminal wire 18 is preferably attached to one of these screw bolts and in practice extends up through a hole 19 of the cover for connection to the circuit wire (when a jar with a cover is used).

The negative element which is designated as 20 is of a cylindrical formation and in practice is also secured to the insulative supporting member 8 and intermediate of the two positive elements, forming an annular receptacle that is preferably filled with oxid of copper in any of the usual forms. The inner side wall 21 is preferably made of perforated sheet metal, while the outer surface is similarly covered by a sheet of wire screen 22. The ends of the cylinder as well as the inner and outer metal protective coverings are engaged by annular caps 23 which further serve to hold the negative element in position and prevent it from flaking away as chemical action takes place. This negative element is supported to the under side of the insulative member by two vertically disposed hook like rods 24 which pass through suitable holes in the insulative supporting member and extend down through and along the inside of the cylindrical negative element and have their extreme lower ends turned out and upward to form a support for the lower end of the negative element which is engaged thereby. The upper ends of the rods are threaded and provided with nuts 25 by means of which the rods are drawn up and the elements clamped against the under side of the supporting member 8.

Upon the under side of the insulative supporting member are formed a series of depending tapered or wedge shaped ribs 26 and 27, which are preferably arranged as between the points of attachment of the several electrodes with the supporting member and so as to prevent the under surface of the supporting member from becoming sufficiently coated at those points to form a metallic bridge from one electrode to another and thus produce a short circuit. These ribs are clearly shown in Fig. 1 and as indicated readily show that each time the element is drawn from the solution the latter will readily drain down the sides of these ribs and drip from the pointed lower end thus cleaning the sides with each insertion or removal from the solution.

To these two rods 24 is also secured the yoke 28 which crosses the opening through the insulative supporting member, there being formed in each end of the said yoke a hole through which the rods are passed and whereby the nuts 25 when attached are immediately secured down upon the top and flat surface of the said yoke. A further hole is formed central of the said yoke and intermediate of the end portions to receive the supporting rod 29 which is provided with a nut 30 whereby the yoke is clamped against the head of the supporting rod. A nut 31 is attached to the rod 29 beneath the cover so that when the rod is carried up through the cover it can be properly secured thereto by means of the outer nut 32 that finally clamps the several parts together and insures the rigid supporting of the assembled element to the cover and at a proper distance therefrom so as to be buried within the solution of the jar. The winged nut 33 obviously serves to secure the field wire 34 to the post.

Figure 6:
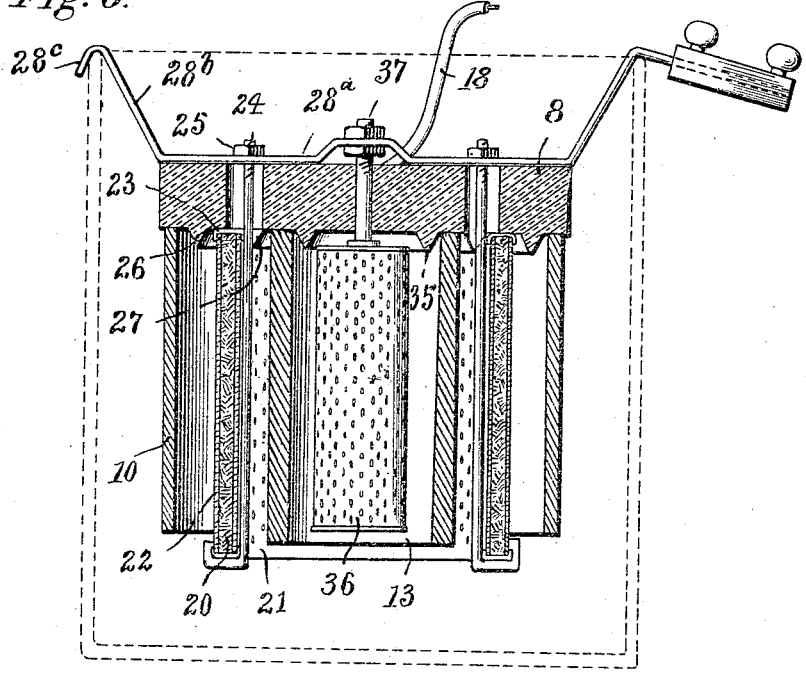
Fig. 6 shows a central vertical sectional view of an assembled element including an insulating block like that shown in Fig. 5 and having two negative electrodes.

In Figs. 5 and 6 we have shown our improved insulating support adapted to support four annular electrodes, two of which are positive and two negative. The insulating support in this form is preferably provided upon its under side with additional circular ribs 35 located between the electrodes 13 and 36. The fourth electrode as employed in this case is located central of the element and as will be noted, is in the form of a small perforated basket 36 that is filled with oxid of metal to form the second negative electrode. This construction forms a more efficient battery as it includes greater areas of working surfaces. The yoke 28$^a$ in this form includes extensions 28$^b$ that are disposed upward and are provided with hooks 28$^c$ to engage the top edge of the battery jar which has no cover. The second negative element in this form is electrically connected with the element 20 and its yoke through the hanger by rod 37.

This feature of two cylindrical forms of positive elements and two cylindrical forms of negative elements being a separately novel feature, it will form the subject matter of a separate patent application to be filed later.

Having thus described our invention what we claim and desire to secure by Letters Patent is:—

1. A battery element support comprising an insulative supporting member, a metal supporting means attached thereto, a series of cylindrical elements attached to the underside of the member, said support having a series of circular ribs upon the underside and disposed between the points of attachment of the said elements.

2. A battery element support comprising an insulative supporting member having an opening therethrough, a metal bridge extending across and attached to the top of the member, a supporting means attached to the bridge, a series of outwardly disposed extensions formed upon the outer edge of the annular insulating member and cylindrical electrodes secured to the underside of said supporting member and one of said electrodes being supported over said extensions.

3. An insulative battery element support comprising an annular insulative supporting member having an opening therethrough, a bridge extending across the support, a supporting means attached to the bridge, a series of extensions formed upon the outer sides of the annular supporting member and having downwardly projecting tapered ribs formed upon the under side.

4. A battery element support comprising an insulative supporting member having an opening therethrough, means for suspending the same from a battery jar, the said insulating member having a series of cut out portions upon both its inner and outer sides to better expose the electrodes when secured thereto and ribs formed upon the underside of that part of the supporting member between the cut out portions.

5. A battery element support comprising an annular insulative supporting member having a central opening therethrough, means for suspending the same from a battery jar, the said annular insulating member having an alternate series of pockets and extended portions upon its inner and outer opposite sides to better support and expose the electrodes when secured thereto.

6. In a battery of the class described, the combination of a single insulative supporting member having an opening therethrough, and circular ribs upon the underside, means for its attachment to a battery jar, a cylindrical negative element attached to the underside of the insulating member between the said ribs, an annular positive element arranged upon both the inside and outside of the said negative element and also secured to the said insulative supporting member.

7. In a battery of the class described, the combination of a single insulative supporting member having extensions upon its inner and outer sides, a single suspending means for its attachment to a battery jar, an inner and outer annular electrode secured against the under side of the said extensions and an electrode of a different polarity secured to the under side of the supporting member and between the electrodes before mentioned, and a single means for engaging and supporting the hangers of each of said positive electrodes.

8. In a battery of the class described, the combination of an insulating supporting member having an opening therethrough, a bridge extending across the top, a supporting means attached to the bridge, two positive elements, connecting rods passing through the insulative supporting member and connecting the positive elements, a cylindrical form of negative element, arranged between the positive element, a pair of rods for securing both the bridge and negative electrodes to the supporting member.

9. In a battery of the class described, the combination of an insulative supporting member having an opening therethrough, a metal bridge extended across the opening, a supporting means attached to the bridge, a cylindrical form of negative element, rods for securing both the bridge and negative electrodes arranged on either side of the negative electrode and means for insulatively securing the said positive electrodes to the supporting member.

10. In a battery of the class described, the combination of an insulative supporting member having an opening therethrough and depending circular ribs upon its underside, a conductor thereon, supporting means attached to the conductor, a tubular form of negative element arranged between the said ribs, means for securing the negative element and conductor to the supporting member, positive electrodes arranged on each side of the negative electrode, and means for securing the positive electrode to the supporting member.

Signed at Waterbury in the county of New Haven and State of Conn. this 8th day of Feb. A. D., 1917.

CHARLES B. SCHOENMEHL.
MARTIN L. MARTUS.

Witnesses:
 ARTHUR A. PAGE,
 RUTH SCHOENMEHL.